(12) United States Patent
Sakaguchi et al.

(10) Patent No.: US 11,383,723 B2
(45) Date of Patent: Jul. 12, 2022

(54) VEHICLE CONTROL DEVICE

(71) Applicant: Hitachi Automotive Systems, Ltd., Hitachinaka (JP)

(72) Inventors: Tomoyasu Sakaguchi, Hitachinaka (JP); Takashi Tsutsui, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 280 days.

(21) Appl. No.: 16/618,678

(22) PCT Filed: Apr. 26, 2018

(86) PCT No.: PCT/JP2018/016924
§ 371 (c)(1),
(2) Date: Dec. 2, 2019

(87) PCT Pub. No.: WO2018/230176
PCT Pub. Date: Dec. 20, 2018

(65) Prior Publication Data
US 2020/0122735 A1  Apr. 23, 2020

(30) Foreign Application Priority Data
Jun. 13, 2017 (JP) .............................. JP2017-115649

(51) Int. Cl.
*B60W 40/114* (2012.01)
*B60W 30/06* (2006.01)

(52) U.S. Cl.
CPC .......... *B60W 40/114* (2013.01); *B60W 30/06* (2013.01); *B60W 2520/06* (2013.01); *B60W 2520/14* (2013.01); *B60W 2520/28* (2013.01)

(58) Field of Classification Search
CPC ............... B60W 40/114; B60W 30/06; B60W 2520/06; B60W 2520/14; B60W 2520/28
See application file for complete search history.

(56) References Cited

U.S. PATENT DOCUMENTS

| 5,402,365 A | * | 3/1995 | Kozikaro ............. G01C 22/025 701/1 |
| 2014/0288828 A1 | * | 9/2014 | Werner .................. G01C 21/00 701/527 |

FOREIGN PATENT DOCUMENTS

| JP | H01-304312 A | 12/1989 |
| JP | H03-090812 A | 4/1991 |

(Continued)

OTHER PUBLICATIONS

Kim Yong Seok, Gyro Sensor Correction Apparatus and Method for Improving Accuracy Location of Car Navigation System, 2016 (Year: 2016).*

(Continued)

*Primary Examiner* — Nicholas Kiswanto
*Assistant Examiner* — Jamal A Shah
(74) *Attorney, Agent, or Firm* — Foley & Lardner LLP (57) ABSTRACT

Provided is a vehicle control device capable of suppressing a yaw angle error at startup due to an initial phase shift of pulse waveforms of right and left wheels at the startup and precisely estimating a vehicle position.

A yaw angle displacement amount of the vehicle is corrected in the direction of reducing an error in the yaw angle displacement amount at the estimation start point with respect to a reference direction in which the vehicle is to travel depending on output of a pulse waveform of a wheel speed sensor provided in right and left non-steering wheels of the vehicle immediately after the startup. Specifically, a range of an estimation error in a traveling direction at the startup is limited by two steps of correction at the startup.

9 Claims, 10 Drawing Sheets

(56) References Cited

FOREIGN PATENT DOCUMENTS

| JP | H05-312585 | A |   | 11/1993 |
|----|------------|---|---|---------|
| JP | 2010-269707 | A |   | 12/2010 |
| JP | 2012-081905 | A |   | 4/2012 |
| KR | 20180003728 | A | * | 1/2018 |

OTHER PUBLICATIONS

Extended European Search Report issued in corresponding European Patent Application No. 18818849.4 dated Mar. 12, 2021.
Wilson et al., "Accelerometer Compensated Differential Wheel Pulse Based Dead Reckoning", 22nd International Meeting of the Satellite Division of The Institute of Navigation, Sep. 22-25, 2009, pp. 3087-3095.
International Search Report with English translation and Written Opinion issued in corresponding application No. PCT/JP2018/016924 dated Aug. 14, 2018.

* cited by examiner

ESTIMATION START POINT

VEHICLE CONTROL DEVICE

TECHNICAL FIELD

The present invention relates to a vehicle control device, and more particularly to a vehicle control device that estimates a position of a vehicle to control the position of the vehicle.

BACKGROUND ART

In the fields of autonomous driving, driving assistance, automatic parking, and the like, it is important for a system itself to know the position of a vehicle so that the system controls the vehicle depending on a situation in the external world. While there are various methods of knowing the position of the vehicle depending on a system configuration, as a method of estimating a position of the vehicle, there has been known a method called dead reckoning that estimates, without using an external world recognition sensor such as a GPS, a radar, and a camera, a vehicle position using information associated with a host vehicle sensor, such as a wheel speed sensor, a steering angle sensor, an acceleration sensor, and a gyro sensor.

A wheel speed sensor generates a pulse waveform by a camcorder attached to a wheel rotating to pass thorough the unevenness, detects rising and falling of the pulse waveform on the side of a controller connected to the wheel speed sensor, and counts the number of times. The total number of times of the rising and falling of the pulse waveform during one rotation of the wheel is determined by the number of teeth of the camcorder, which is, for example, counted 90 times per wheel rotation. The rotation angle of the wheel can be measured from the count (number), and the travel distance of the wheel (i.e., vehicle) can be known together with information associated with a circumferential length of the wheel.

In particular, since the vehicle travels only at a low speed in an automatic parking system, wheel slippage almost negligible. Accordingly, there has been known that high accuracy can be obtained in dead reckoning using only a wheel speed sensor or dead reckoning in which a wheel speed sensor and another sensor are combined.

PTL 1 set out below discloses a method of dead reckoning using a wheel speed sensor and a gyro sensor, in which a travel distance is determined using the wheel speed sensor and a yaw angle of a vehicle is determined using the gyro sensor.

Meanwhile, in a case where a straight line connecting two wheels of vehicle wheels constantly passes near the turning center (the two wheels are non-steering wheels in many vehicles, that is, right and left rear wheels), it is also possible to determine the travel distance and the yaw angle of the vehicle using only the wheel speed sensors of the two wheels. A sequence outline of the dead reckoning method using only a wheel speed pulse count counted from the pulse waveform generated by the wheel speed sensor is as follows.

(1) A yaw angle displacement amount $\theta$ is calculated from the wheel speed pulse count of the wheel speed sensor provided in the right and left non-steering wheels using the following formula (1).

[Formula 1]

$\theta$=difference in wheel speed pulse count of right and left wheels×travel distance per pulse/rear wheel tread length  Formula (1)

During forward travel, a yaw angle displacement amount in the clockwise direction of the vehicle (as viewed from above) is obtained if the count of the left wheel is larger. A yaw angle displacement amount in the counterclockwise direction of the vehicle (as viewed from above) is obtained if the count of the right wheel is larger. In the case of reverse travel, the directions are opposite.

(2) A travel distance L at the center of the right and left non-steering wheels is calculated from the wheel speed pulse count using the following formula (2).

[Formula 2]

travel distance $L$=average of wheel speed pulse count of right and left wheels×travel distance per pulse  Formula (2)

(3) A forward and backward traveling direction is detected from a gear position of the vehicle. The traveling direction is detected as +1 if the gear position is the forward gear, and the traveling direction is detected as −1 if the gear position is the reverse gear. In a case where the wheel speed sensor includes a mechanism of detecting a rotational direction of the wheel, the detection process from the gear position is not required.

(4) From the yaw angle displacement amount $\theta$, the travel distance L, and the forward and backward traveling direction of the vehicle, a relative position and a relative direction with respect to the axial center of the right and left non-steering wheels of the vehicle and an estimation start state in the traveling direction is output using the following formulae (3) to (5).

[Formula 3]

yaw angle=previous yaw angle+(traveling direction)×yaw angle displacement amount $\theta$  Formula (3)

[Formula 4]

$X$ coordinate=previous $X$ coordinate+(traveling direction)×sin(yaw angle)×(travel distance $L$)  Formula (4)

[Formula 5]

$Y$ coordinate=previous $Y$ coordinate+(traveling direction)×cos(yaw angle)×(travel distance $L$)  Formula (5)

By executing the sequence of (1) to (4) mentioned above in each control cycle, a relative position of the vehicle (host vehicle position) from the estimation start point (e.g., startup position) can be estimated.

CITATION LIST

Patent Literature

PTL 1: JP 2012-81905 A

SUMMARY OF INVENTION

Technical Problem

In the case of calculating the XY coordinates and the yaw angle using the wheel speed sensor as described above, the vehicle position is estimated on the basis of the number of counts, which is a quantized value, whereby both of the travel distance and the yaw angle are affected by the quantization. Although they tend to be considered as giving a quantization error to the calculation result, an initial phase shift of the pulse waveform of the right and left wheels at startup largely affects the accuracy in vehicle position estimation. The initial phase shift mainly causes an estimated direction error at startup (hereinafter referred to as yaw angle error at startup). The yaw angle error at startup affects all results of the vehicle position estimation after the startup, and the estimated position error becomes large in proportion to a distance from the startup position.

Figure 8:
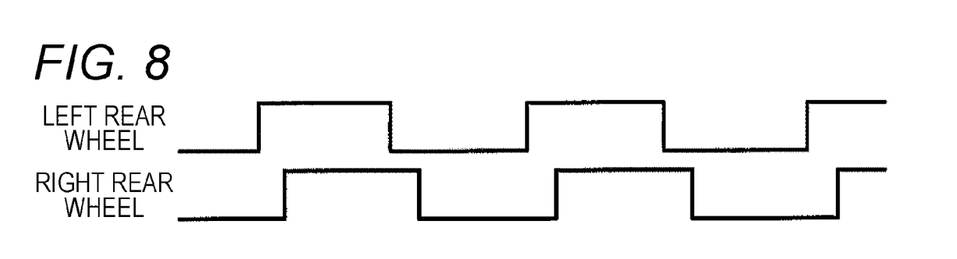
FIG. 8 is a diagram illustrating a pulse waveform obtained by shaping a waveform generated by a wheel speed sensor at an extremely low speed.

The mechanism by which the yaw angle error at startup mentioned above occurs will be described more specifically. FIG. 8 illustrates a pulse waveform obtained by shaping a waveform generated by the wheel speed sensor at an extremely low speed. Since there are few cases where phases of the pulse waveforms of the right and left wheels are completely synchronized, in a case where path lengths of the right and left wheels are substantially the same, the wheel speed pulse count of the wheel speed sensors provided in the right and left wheels endlessly repeats left/right or right/left at the extremely low speed.

Figure 9:
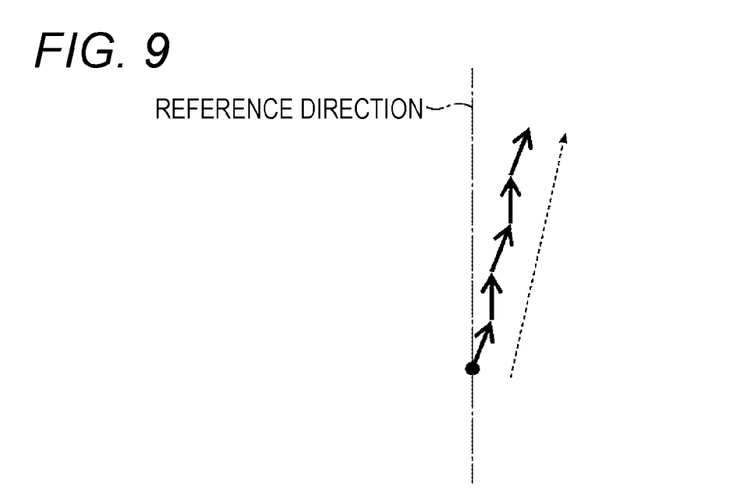
FIG. 9 is a diagram illustrating a locus of vehicle position estimation at the extremely low speed immediately after a startup.

FIG. 9 illustrates a locus of the vehicle position estimation at the extremely low speed immediately after the startup. In algorithm of the dead reckoning described above, zigzag skewing is made in the direction in which the yaw angle has changed in the first pulse. As a whole, t skewing direction is a direction of one-half of the yaw angle change amount for one pulse (relative to the reference direction in which the vehicle is to travel).

Figure 10:
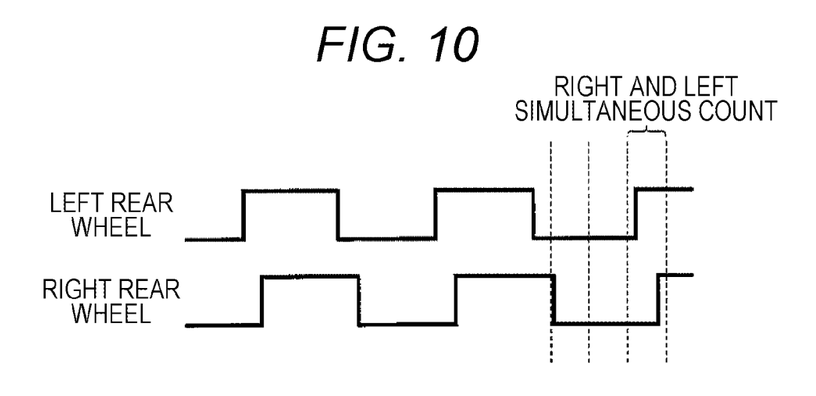
FIG. 10 is a diagram illustrating a condition of the pulse waveform when a speed is increased by acceleration from a state of the extremely low speed.

FIG. 10 illustrates a condition of the pulse waveform when a speed is increased by acceleration from the state of the extremely low speed. When the speed of the vehicle increases, the probability that the pulses in the pulse waveforms of the right and left wheels are counted at the same control interval (hereinafter may be referred to as right and left simultaneous count or right and left simultaneous pulse detection) increases. In a case where a difference in pulse timing between the right and left wheels is small, the probability of the right and left simultaneous count further increases.

Figure 11:
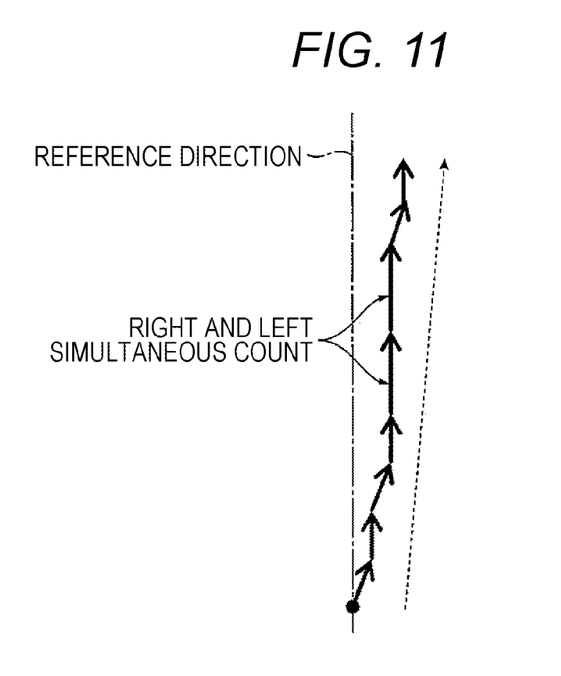
FIG. 11 is a diagram illustrating a locus of vehicle position estimation when the speed is increased after the startup.

FIG. 11 illustrates a locus of the vehicle position estimation when the speed is increased after the startup. As a whole, the traveling direction at the time of departure is dependent on the phase difference between the pulse waveforms of the right and left wheels.

Figure 12:
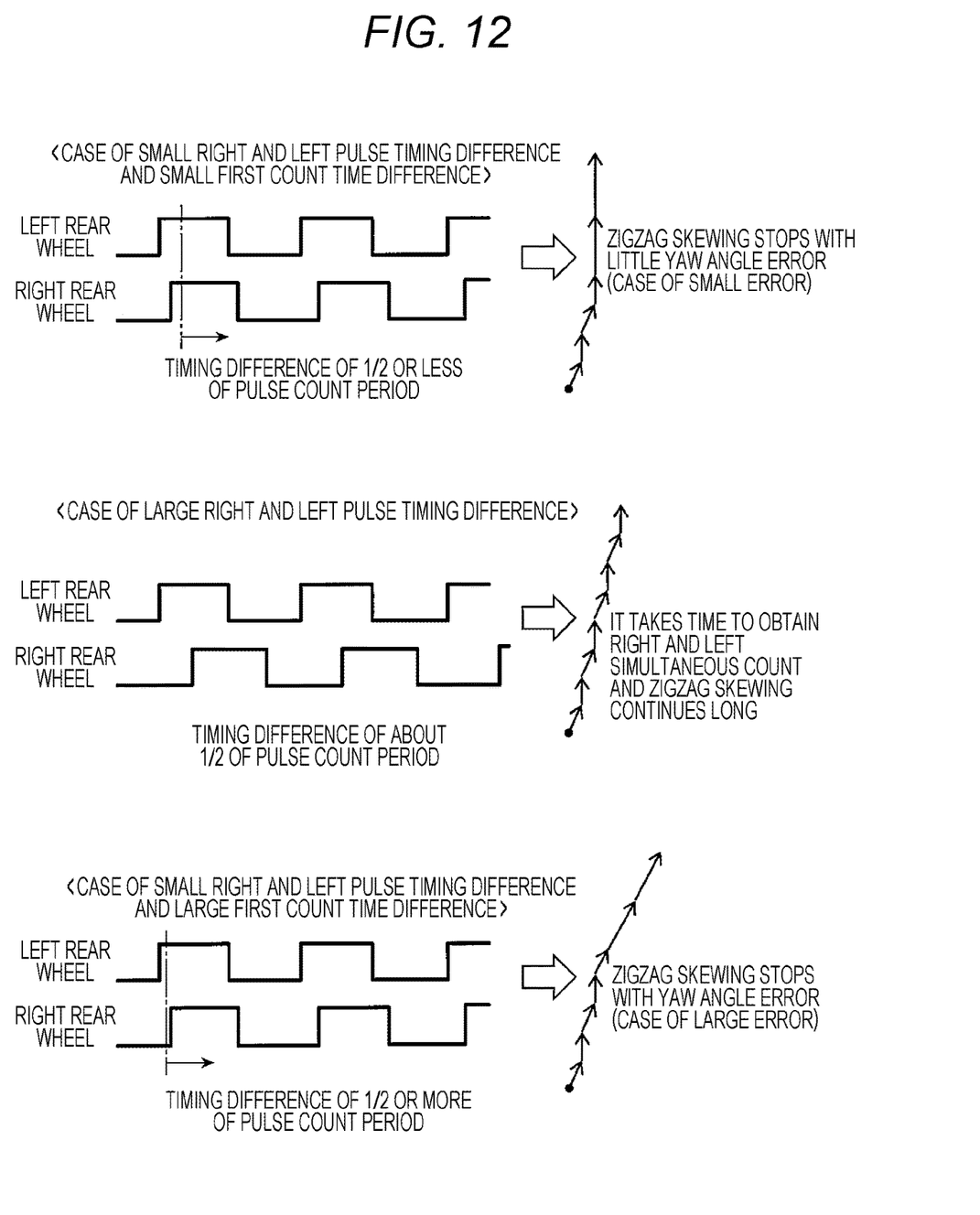
FIG. 12 is a diagram illustrating a difference in locus of vehicle position estimation based on a difference in pulse timing between right and left wheels.

FIG. 12 illustrates a difference in locus of the vehicle position estimation based on the difference in pulse timing between the right and left wheels. In a case where the difference in pulse timing between the right and left wheels is small compared to a pulse count period (upper case in FIG. 12), the zigzag skewing stops at an early stage with little yaw angle error when the speed increases, and the locus of the vehicle position estimation starts to move in the forward direction (reference direction to be originally traveled). In a case where the difference in right and left pulse timing is about a half of the pulse count period (middle case in FIG. 12), the zigzag skewing continues long. In a case where the difference in right and left pulse timing is larger than the half of the pulse count period and close to the pulse count period (lower case in FIG. 12), the zigzag skewing stops at an early stage with the yaw angle error when the speed increases, and the locus of the vehicle position estimation starts to move in the skewing direction (direction skewed to the reference direction to be originally traveled). In this manner, the traveling direction at startup is dependent on the phase difference between the pulse waveforms of the right and left wheels.

Figure 13:
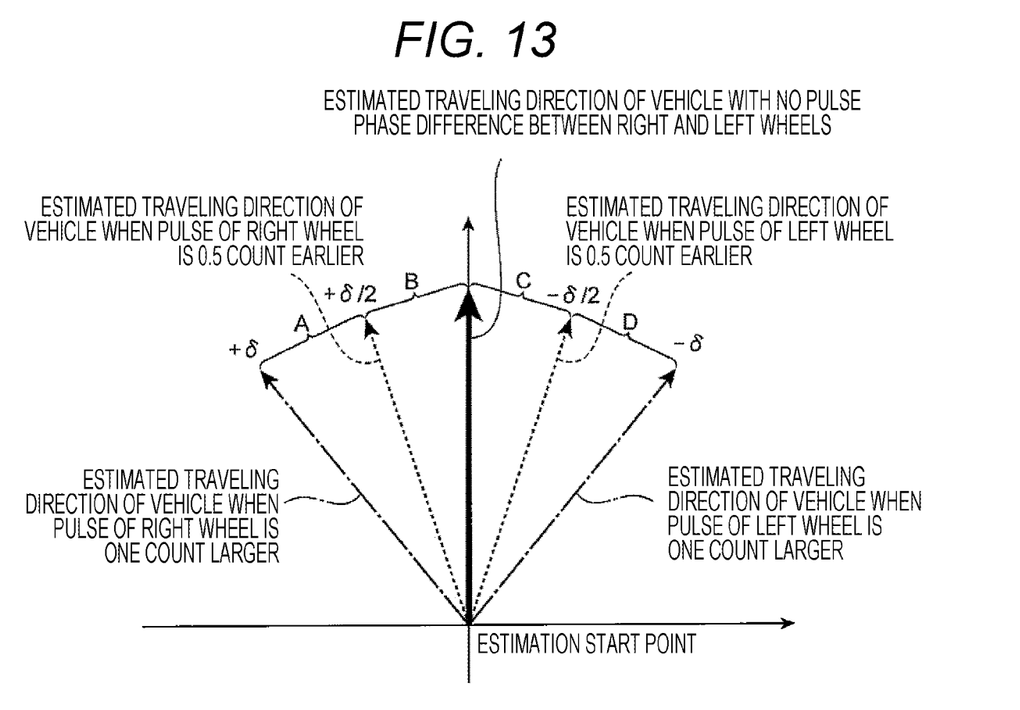
FIG. 13 is a diagram illustrating an error range of the locus of the vehicle position estimation based on the difference in pulse timing of the right and left wheels.

FIG. 13 illustrates an error range of the locus of the vehicle position estimation based on the difference in pulse timing of the right and left wheels. In a case where there is no difference in pulse timing (pulse phase difference) between the right and left wheels, the traveling direction of the estimated locus is assumed to be the upward direction in FIG. 13. In addition, right and left dot-dash-line arrows indicate directions rotated to the right and left by a yaw angle displacement amount δ (travel distance per pulse/rear wheel tread length) based on the difference in right and left wheel speed pulse count of one pulse with respect to the traveling direction.

The estimated locus of the vehicle in the traveling direction advances to an area A in FIG. 13 in a case where the difference in pulse timing of the right wheel is larger than the half of the pulse count period, and the estimated locus of the vehicle in the traveling direction advances to an area B in FIG. 13 in a case where the difference in pulse timing of the right wheel is smaller than the half of the pulse count period. The estimated locus of the vehicle in the traveling direction advances to an area C in FIG. 13 in a case where the difference in pulse timing of the left wheel is smaller than the half of the pulse count period, and the estimated locus of the vehicle in the traveling direction advances to an area D in FIG. 13 in a case where the difference in pulse timing of the left wheel is larger than the half of the pulse count period. In this manner, the yaw angle error at startup of the vehicle position estimation is spread within each of the areas mentioned above depending on the difference in pulse timing of the right and left wheels.

Figure 14:
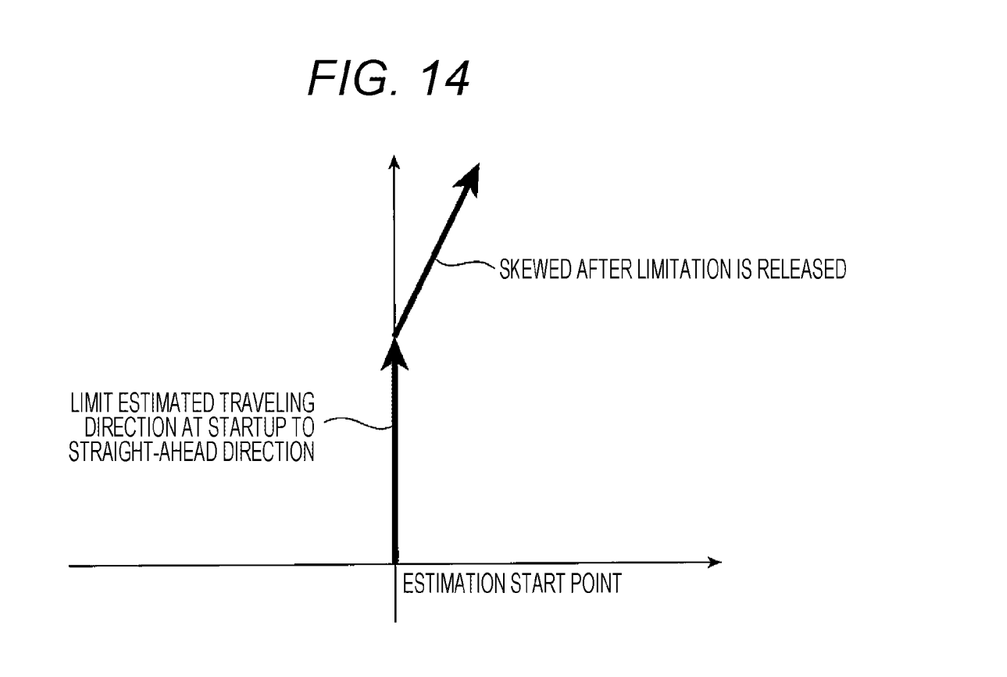
FIG. 14 is a diagram illustrating a method of limiting an estimated position of the vehicle immediately after the startup to the straight-ahead direction without considering a difference in pulse phase of the right and left wheels at the startup.

In order to cope with such a situation, as a simple measure, a method of limiting the estimated position of the vehicle immediately after the startup to the straight-ahead direction without considering the difference in pulse phase of the right and left wheels at the startup is conceivable, as illustrated in FIG. 14.

However, according to such a method, when the vehicle starts turning immediately after the startup, the turning cannot be detected. Moreover, in a case where only a slight distance immediately after the startup is limited to the straight-ahead direction so that the turning can be detected, an error occurrence point is merely simply advanced by the distance for making limitation to the straight-ahead direction.

The present invention has been conceived in view of the above problems, and an object of the present invention is to provide a vehicle control device capable of suppressing a yaw angle error at startup due to an initial phase shift of a pulse waveform of right and left wheels at startup and estimating a vehicle position precisely.

Solution to Problem

In order to achieve the object mentioned above, a vehicle control device according to the present invention calculates a yaw angle displacement amount and a travel distance of a vehicle from a wheel speed pulse count counted from a pulse waveform generated by a wheel speed sensor provided in right and left non-steering wheels of the vehicle, detects a forward and backward traveling direction of the vehicle, and outputs a relative position and a relative direction of the vehicle from an estimation start state to estimate a vehicle position of the vehicle on the basis of the yaw angle displacement amount, the travel distance, and the forward and backward traveling direction of the vehicle, in which the yaw angle displacement amount of the vehicle is corrected in a direction of reducing an error in the yaw angle displacement amount at the estimation start point with respect to a reference direction in which the vehicle is to travel depending on output of the pulse waveform from the wheel speed sensor provided in the right and left non-steering wheels of the vehicle immediately after a startup.

Advantageous Effects of Invention

According to the present invention, it is possible to suppress a yaw angle error at startup due to an initial phase shift of pulse waveforms of right and left wheels at the startup and to improve accuracy in vehicle position estimation.

Problems, configurations, and effects other than those described above will be clarified in the following descriptions of the embodiments.

DESCRIPTION OF EMBODIMENTS

Hereinafter, an embodiment of the present invention will be described with reference to the accompanying drawings.

Note that, in each of the drawings, members or elements having the same operation or function are denoted by the same reference signs, and duplicate descriptions thereof will be omitted as appropriate.

The present embodiment to be described below is an example in which a vehicle position estimation system including a vehicle control device according to the present invention is applied to an automatic parking system. Since the automatic parking system controls a vehicle at a relatively low speed so that wheel slippage that causes an error in vehicle position estimation using a wheel speed sensor hardly occurs, it is suitable for applying the vehicle position estimation system including the vehicle control device according to the present invention. The automatic parking system in the present embodiment is capable of detecting a relative positional relationship between the host vehicle and various objects in the external world using an external world recognition means, such as a camera and a radar, and once the relative positional relationship is detected, it is capable of planning an automatic parking starting point, an automatic parking target point, an automatic parking path, and the like.

Figure 1:
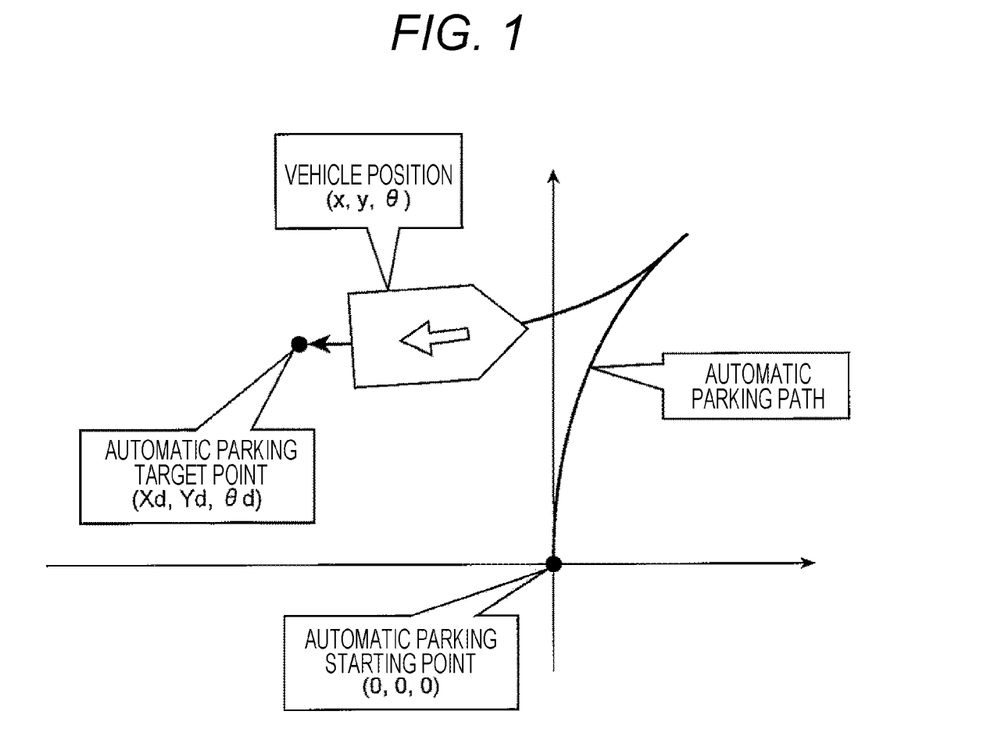
FIG. 1 is a diagram illustrating a condition in which an automatic parking system performs feedback control while comparing a vehicle position with an automatic parking path on the basis of vehicle position estimation performed by a vehicle position estimation system including a vehicle control device according to the present invention so that the vehicle reaches an automatic parking target point from an automatic parking starting point.

As illustrated in FIG. the automatic parking system described above performs feedback control while comparing the host vehicle position with the automatic parking path on the basis of vehicle position estimation performed by the vehicle position estimation system including the vehicle control device according to the present invention, thereby causing the host vehicle to reach the automatic parking target point from the automatic parking starting point. However, in the following descriptions of the present embodiment, the descriptions will be focused on the vehicle position estimation system in the automatic parking system to simplify the descriptions.

Figure 2:
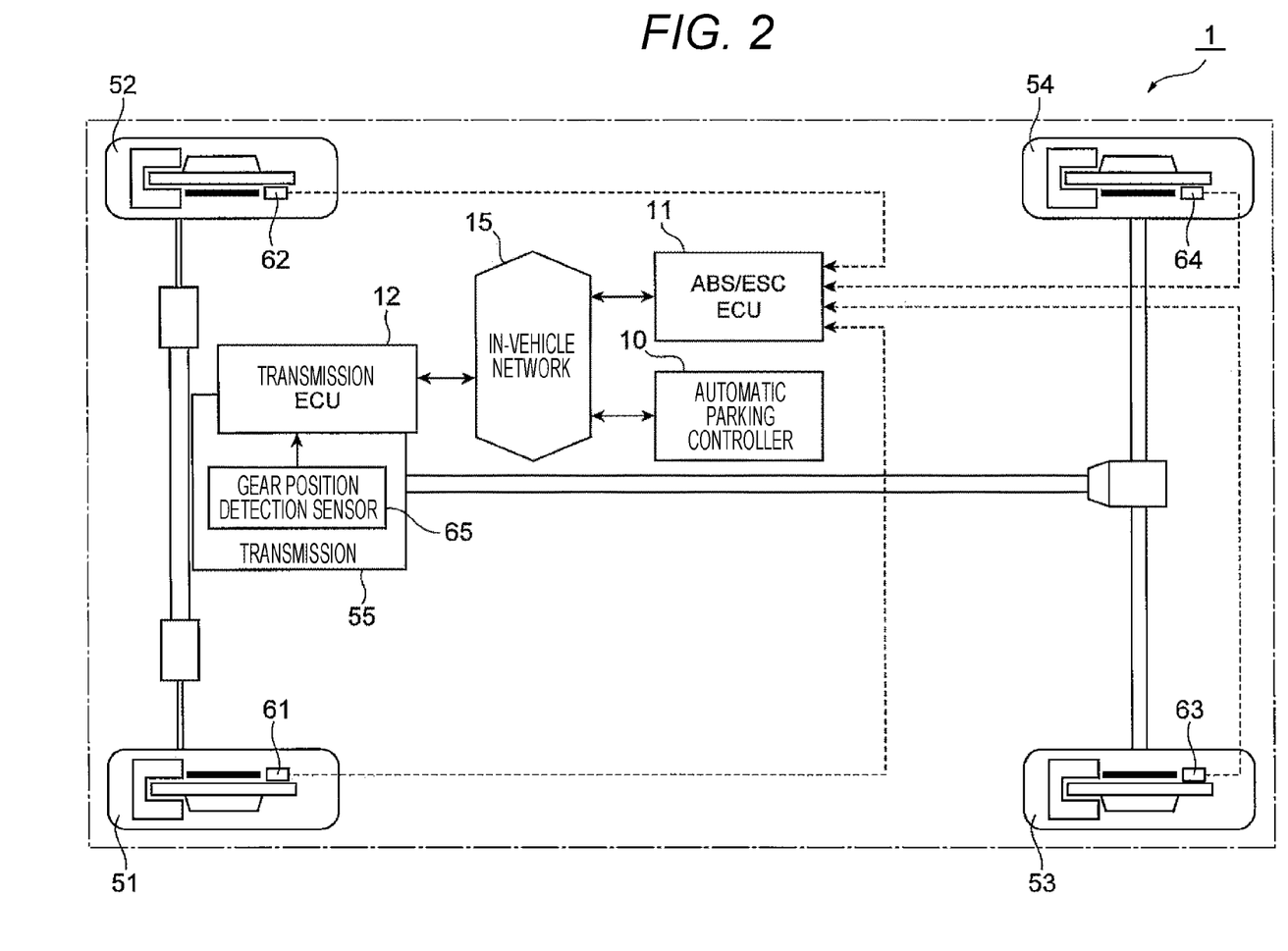
FIG. 2 is an overall configuration diagram illustrating an exemplary vehicle position estimation system including an embodiment of a vehicle control device according to the present invention.

FIG. 2 is an overall configuration diagram illustrating an example of the vehicle position estimation system including an embodiment of the vehicle control device according to the present invention. As illustrated in FIG. 2, a vehicle position estimation system 1 mainly includes wheel speed sensors 61 to 64 provided in right and left steering wheels 51 and 52 including right and left front wheels and right and left non-steering wheels 53 and 54 including right and left rear wheels, an antilock brake system (ABS)/electronic stability control (ESC) electronic control unit (ECU) 11 connected to the wheel speed sensors 61 to 64, a gear position detection sensor 65 included in a transmission 55, a transmission ECU 12 connected to the gear position detection sensor 65, and an automatic parking controller 10 serving as a vehicle control device, and the ABS/ESC ECU 11, the transmission ECU 12, and the automatic parking controller 10 are communicably connected to each other via an in-vehicle network (CAN) 15. The wheel speed sensors 61 to 64 generate pulse waveforms according to rotation of the wheels, detect rising and falling of the pulse waveforms on the side of the ABS/ESC ECU 11, count the number of times (number of pulses), and continuously notifying the automatic parking controller 10. The gear position detection sensor 65 is a sensor for discriminating between the forward gear and the reverse gear of the transmission 55, which detects the current gear position on the side of the transmission ECU 12, and continuously notifying the automatic parking controller 10.

Figure 3:
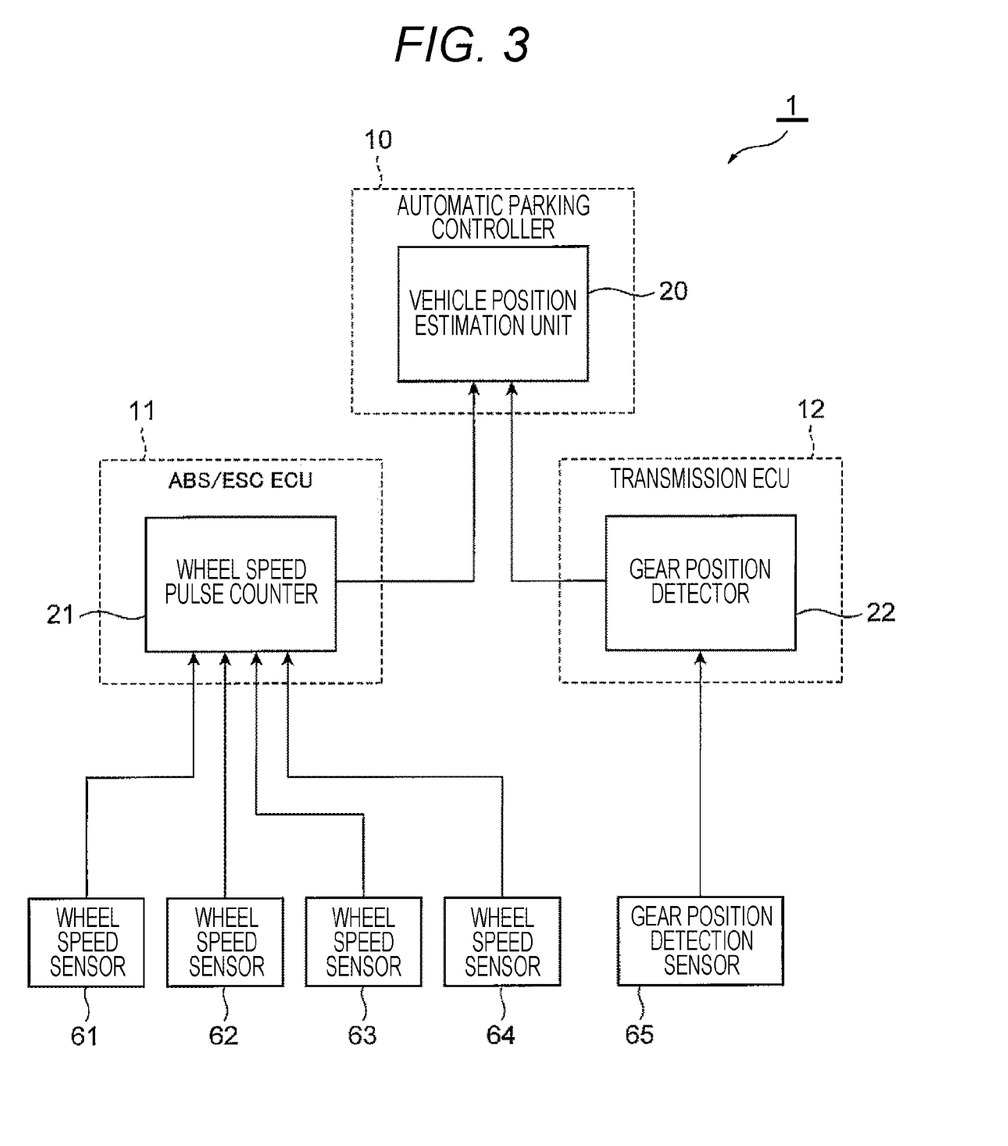
FIG. 3 is a control block diagram illustrating a control configuration of the automatic parking system illustrated in FIG. 2.

FIG. 3 is a control block diagram illustrating a control configuration of the automatic parking system illustrated in FIG. 2. As illustrated in FIG. 3, the ABS/ESC ECU 11 includes a wheel speed pulse counter 21, the transmission ECU 12 includes a gear position detector 22, and the automatic parking controller 10 includes a vehicle position estimation unit 20.

The wheel speed pulse counter 21 is a control block mounted in the ABS/ESC ECU 11, which shapes the waveforms generated from the wheel speed sensors 61 to 64 into pulse waveforms, and counts both the rising edges and the falling edges of the pulse waveforms. The counted value (wheel speed pulse count) is represented by, for example, an integer value of 0 to 255, and is a cyclic value that returns to 0 when it exceeds 255. The wheel speed pulse counter 21 transmits information including the counted value to the in-vehicle network (CAN) 15, and other controllers including the automatic parking controller 10 can obtain the counter values of the wheel speed sensors 61 to 64 by receiving the information from the in-vehicle network (CAN) 15.

The gear position detector 22 is a control block mounted in the transmission ECU 12, which transmits information including the gear position information detected by the gear position detection sensor 65 to the in-vehicle network (CAN) 15, and other controllers including the automatic parking controller 10 can obtain the gear position information by receiving the information from the in-vehicle network (CAN) 15.

The vehicle position estimation unit 20 is a control block mounted in the automatic parking controller 10, which outputs a relative position and a relative direction of the vehicle from the estimation start state on the basis of the counter values of the wheel speed sensors 61 to 64 of the respective wheels generated by the wheel speed pulse counter 21 and the gear position information generated by the gear position detector 22 to estimate a vehicle position of the vehicle, and provides the estimated vehicle position information to other functions in the automatic parking controller 10.

Figure 4:
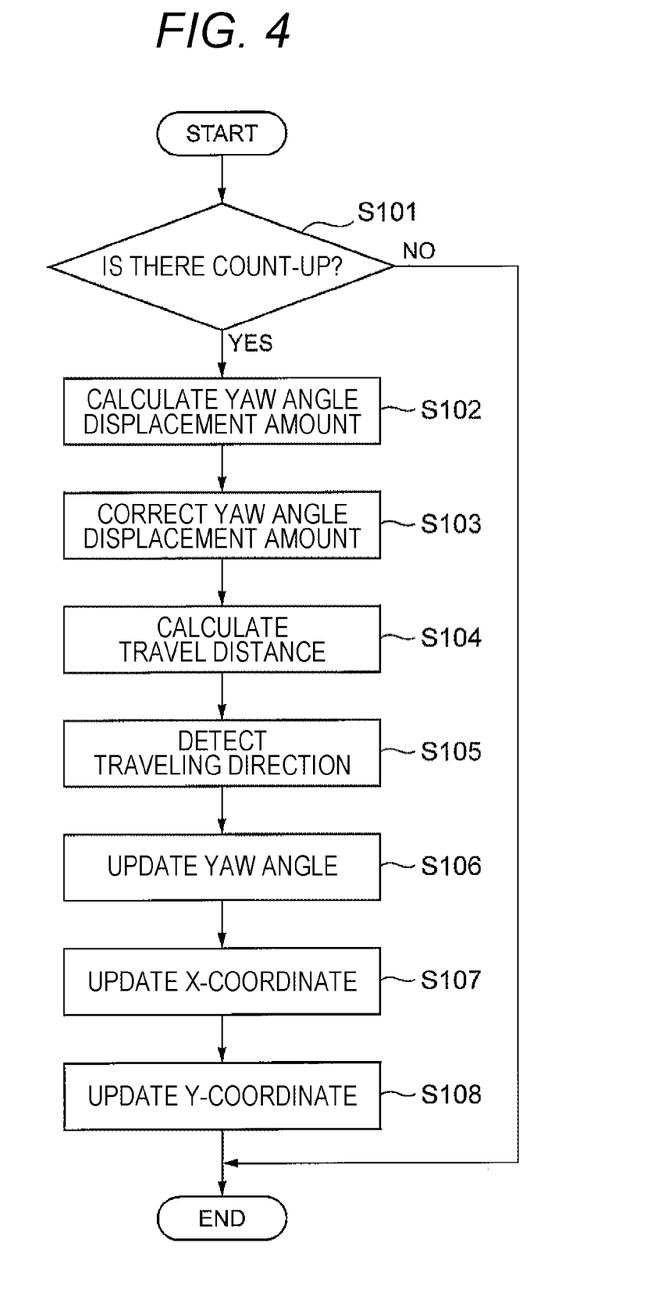
FIG. 4 is a flowchart schematically illustrating a method of estimating a vehicle position based on dead reckoning in a vehicle position estimation unit illustrated in FIG. 3.

FIG. 4 is a flowchart schematically illustrating a method of estimating a vehicle position based on dead reckoning in the vehicle position estimation unit illustrated in FIG. 3. The sequence illustrated in the present flowchart operates every control cycle after estimation of the vehicle position estimation starts.

When the vehicle position estimation unit 20 starts a process, first, it is determined whether or not there is a count-up in the right and left rear wheels (non-steering wheels) (step S101). If there is no count-up, the process in the control cycle is terminated. On the other hand, if there is a count-up, a yaw angle displacement amount θ is calculated using the formula (1) mentioned above (step S102). Next, correction of the yaw angle displacement amount θ to be described later is performed (step S103). Next, a travel distance L is calculated using the formula (2) mentioned above (step S104). Next, a traveling direction is detected from the gear position information generated by the gear position detector 22 (step S105). The traveling direction is detected as +1 if the gear position is the forward gear, and the traveling direction is detected as −1 if the gear position is the reverse gear. Next, yaw angle update is calculated using the formula (3) mentioned above (step S106), X-coordinate update is calculated using the formula (4) mentioned above (step S107), and Y-coordinate update is calculated using the formula (5) mentioned above (step S108).

Note that, as described above, in the case where the wheel speed sensor has a mechanism for detecting the rotational direction of the wheel, the forward and backward traveling direction can be detected on the basis of the information obtained from the wheel speed sensor instead of the forward and backward traveling direction being detected from the gear position information.

Figure 5:
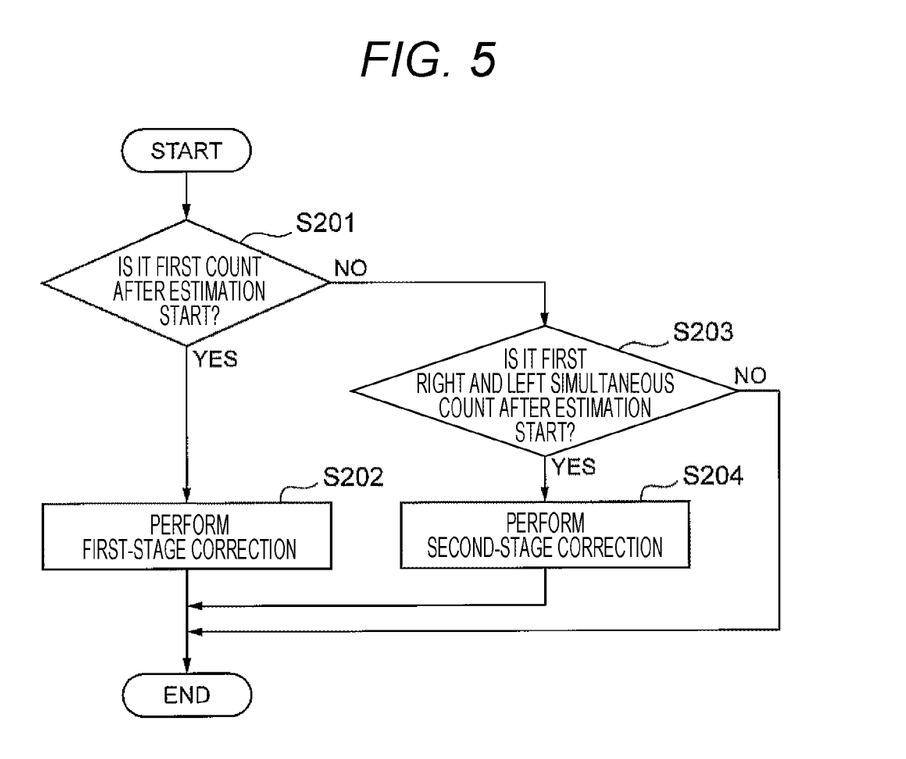
FIG. 5 is a flowchart illustrating a method of correcting a yaw angle displacement amount illustrated in FIG. 4.

FIG. 5 illustrates a method of correcting the yaw angle displacement amount illustrated in FIG. 4. After calculation of the yaw angle displacement amount θ, first, it is determined whether or not the current count is the first count after the estimation start (i.e., after startup) (step S201). If the determination result is positive, first-stage correction is performed (step S202). In the first-stage correction, correction is performed such that one-half (½) of a yaw angle displacement amount S for one pulse based on the calculation of the yaw angle displacement amount θ performed at the previous stage of the correction process is reduced (in the direction of reducing the error in yaw angle displacement amount at the estimation starting point). There is no problem in a similar process even in a case where the first count after the estimation start is a right and left simultaneous count. Note that, although the correction of reducing the one-half of the yaw angle change (yaw angle displacement amount) S for the first one pulse at startup of the vehicle from the yaw angle displacement amount θ (in the direction of reducing the error in yaw angle displacement amount at the estimation start point) is performed here, it is needless to say that the correction amount can be set to an appropriate amount other than the one-half of the yaw angle change (yaw angle displacement amount) δ for the first one pulse as long as the yaw angle error at startup can be suppressed.

If the result of the determination in step S201 is negative, it is determined whether or not it is the first right and left simultaneous count after the estimation start (step S203). If the determination result is positive, second-stage correction is performed. In the second-stage correction, correction is performed such that one-half of the latest yaw angle is reduced (in the direction of reducing the error in yaw angle displacement amount at the estimation start point) with respect to the latest yaw angle. Note that, although the correction of reducing the yaw angle displacement amount θ (in the direction of reducing the error in yaw angle displacement amount at the estimation start point) by one-half of the yaw angle with respect to the reference direction (direction in which the vehicle is to travel) at the time of the first right and left simultaneous pulse detection at startup of the vehicle is performed here, is needless to say that the correction amount can be set to an appropriate amount (e.g., amount of one-third or one-fourth) other than the one-half of the yaw angle with respect to the reference direction at the time of the first right and left simultaneous pulse detection as long as the yaw angle error at startup can be suppressed. If the determination in step S203 is negative, the correction described above is not performed.

Figure 6:
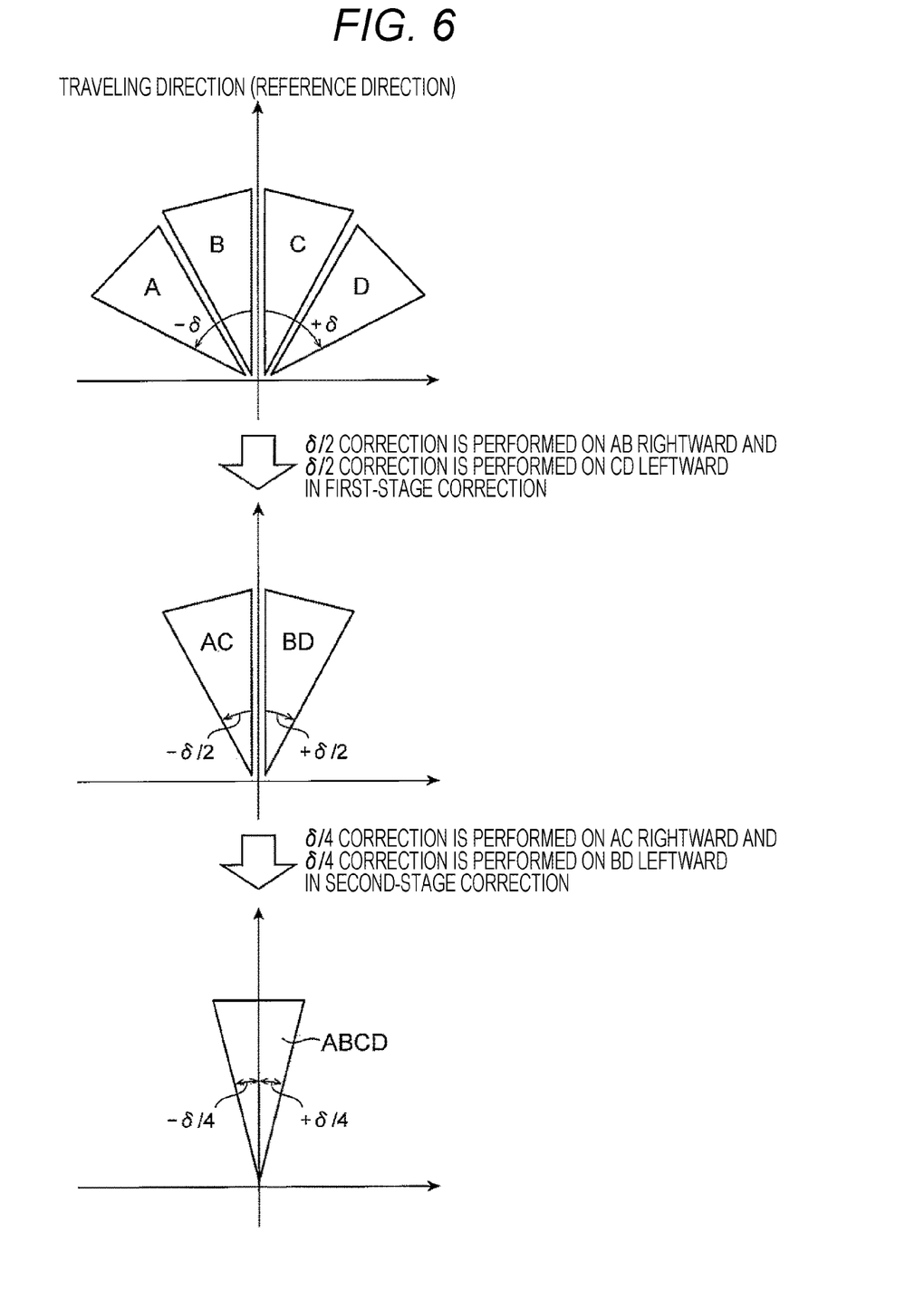
FIG. 6 is a diagram illustrating effects of the correction illustrated in FIGS. 4 and 5.

FIG. 6 is a diagram illustrating effects of the correction described with reference to FIGS. 4 and 5. As described with reference to FIG. 13, the yaw angle error at startup is dispersed within the range of the yaw angle displacement amount (±δ) based on the pulse count difference for one pulse. In the first-stage correction in step S202 of FIG. 5, correction of +δ/2, which is one-half of the yaw angle change for one pulse, is performed for the yaw angle error skewed to the left toward the traveling direction (reference direction), and correction of −δ/2, which is one-half of the yaw angle change for one pulse, is performed for the yaw angle error skewed to the right, whereby the range of the yaw angle error can be limited within the range of the half (±δ/2) of the yaw angle displacement amount based on the pulse count difference for one pulse. Further, in the second-stage correction in step S204 of FIG. 5, with regard to the yaw angle error after the first-stage correction, correction of $+\delta/4$ ($=+\delta/2\times1/2$) is performed for the yaw angle error skewed to the left toward the traveling direction (reference direction), and correction of $-\delta/4$ ($=-\delta/2\times1/2$) is performed for the yaw angle error skewed to the right, whereby the range of the yaw angle error can be limited within the range of $\pm\delta/4$.

As described above, the automatic parking controller (vehicle control device) 10 according to the present embodiment performs the following two steps of yaw angle error correction in the calculation of the yaw angle displacement amount $\theta$ on the basis of the mechanism in which the yaw angle error occurs at startup.

That is, in the first-stage correction, correction of the amount corresponding to the yaw angle change S for the first one pulse, specifically, the one-half of the yaw angle change $\delta$ for the first one pulse is made in the opposite direction (in the direction of reducing the error in yaw angle displacement amount at the estimation start point) relative to the direction of the yaw angle change based on the first one pulse at startup. The present correction is made since it is estimated that, on the basis of the dead reckoning, right and left alternate count is performed at an extremely low speed and the vehicle travels in the direction of the one-half of the yaw angle change $\delta$ based on the first one pulse as a whole.

Further, in the second-stage correction, correction of a correction amount of a predetermined ratio of the yaw angle change $\delta$ for one pulse is made in the direction (direction of reducing the error in yaw angle displacement amount at the estimation start point) opposite to the yaw angle change in the direction of being away from the traveling direction (reference direction) at the time of first detecting the right and left simultaneous pulse when the vehicle speed is rising. This correction amount can be obtained by, for example, reducing the latest yaw angle by the one-half of the latest yaw angle.

Accordingly, the range of the yaw angle error at startup can be limited to one-half of that before the correction according to the first-stage correction, and the range of the error obtained by the range of the yaw angle error at startup being limited by the first-stage correction can be further limited to equal to or less than one-half thereof according to the second-stage correction (see particularly FIG. 6). As a result, it becomes possible to suppress the yaw angle error at startup due to the initial phase shift of the pulse waveform of right and left wheels at startup, and to improve the accuracy in vehicle position estimation.

Note that, in the wheel speed sensor used for the vehicle position estimation mentioned above, while the probability of the first pulse of the right and left wheels at startup is 50%:50%, there may be a defect or abnormality in the wheel speed sensor in a case where the occurrence probability is biased to one side (e.g., 30%:70%). Since the accuracy in vehicle position estimation (i.e., automatic parking) lowered if there a defect or abnormality in the wheel speed sensor, for example, statistics for a predetermined number of times on the startup without turning are obtained in advance (i.e., yaw angle change based on the first one pulse at startup is stored in advance for each startup), and in a case where bias is observed (i.e., occurrence probability in the direction of yaw angle change differs from side to side), it is determined that abnormality occurs in the wheel speed sensor, and warning (warning indicating a loss in accuracy) is issued. In addition, backup is also performed by the front wheels in consideration of that case, and in the situation mentioned above, it is conceivable that the vehicle position is estimated using the wheel speed pulse count counted from the pulse waveform generated by the wheel speed sensor provided in the right and left front wheels (steering wheels) instead of the wheel speed sensor provided in the right and left rear wheels (non-steering wheels) while accepting the loss in accuracy.

Figure 7:
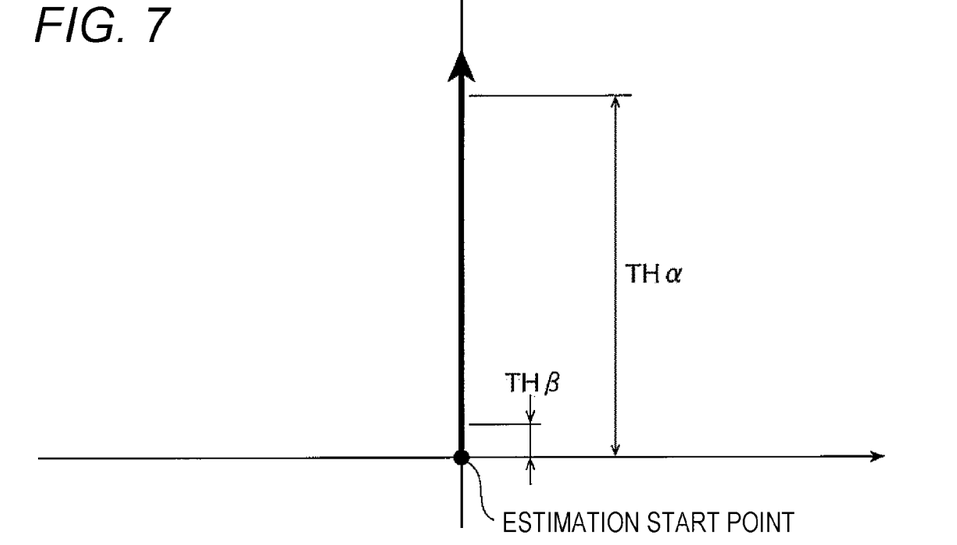
FIG. 7 is a diagram illustrating an exemplary range in which the correction of the yaw angle displacement amount illustrated in FIGS. 4 and 5 is to be performed.

In addition to the configuration described above, in the situation where the steering is steered to the right and left beyond the vicinity of the neutral point, the probability of correcting the yaw angle correction direction based on the first detection of the right and left simultaneous pulse in the opposite direction is stored together with the travel distance. The travel distance at which the probability of correction in the opposite direction becomes a predetermined value or more is stored, and the execution of the correction described above is restricted at the travel distance or more. In other words, as illustrated in FIG. 7, the range of executing the correction of the yaw angle displacement amount $\theta$ is limited to the range within a predetermined distance TH$\alpha$ of the travel distance from the estimation start point, specifically, to a range within a distance in which the probability that the direction of correcting the yaw angle displacement amount of the vehicle and the steering direction of the vehicle do not match falls within a predetermined probability and in which turning has little affect. Furthermore, in a case where the travel distance is equal to or less than a threshold value TH$\beta$ determined in advance, there may be characteristic bias in the vehicle or the wheel speed sensor (e.g., circumferential lengths of right and left wheels are different, a duty ratio of the pulse released by the wheel speed sensor largely deviates from 50:50, etc.), whereby warning (warning indicating a small decrease in accuracy) is issued and the correction described above is restricted in such a situation. That is, the correction described above is performed in the range where the travel distance is from TH$\beta$ to TH$\alpha$. This makes it possible to estimate the vehicle position more precisely.

Note that the present invention is not limited to the embodiment described above, and includes various modifications. For example, the above-described embodiment has been described in detail for convenience of explaining the present invention in a manner easy to understand, and is not necessarily limited to that having all the described configurations.

Moreover, each of the above-described configurations, functions, processing units, processing means, and the like may be partially or entirely implemented by hardware, for example, by designing them with an integrated circuit and the like. Each of the above-described configurations, functions, and the like may be implemented by software by interpreting and executing a program for implementing each function using a processor. Information such as a program, a table, and a file for implementing each function may be stored in a storage device, such as a memory, a hard disk, and a solid state drive (SSD), or a recording medium, such as an IC card, an SD card, and a DVD.

Besides, control lines and information lines are indicated using what considered to be necessary for explanation, and all the control lines and the information lines are not necessarily illustrated for products. In practice, it may be considered that almost all the configurations are mutually connected.

REFERENCE SIGNS LIST 1 vehicle position estimation system
10 automatic parking controller (vehicle control device)
11 ABS/ESC ECU
12 transmission ECU 15 in-vehicle network (CAN)
20 vehicle position estimation unit
21 wheel speed pulse counter
22 gear position detector
51 left front wheel (left steering wheel)
52 right front wheel (right steering wheel)
53 left rear wheel (left non-steering wheel)
54 right rear wheel (right non-steering wheel)
55 transmission
61 to 64 wheel speed sensor
65 gear position detection sensor

The invention claimed is:

1. A vehicle control device, comprising:
at least one processor configured to:
calculate a yaw angle displacement amount and a travel distance of a vehicle from a wheel speed pulse count counted from a pulse waveform generated by a wheel speed sensor provided in right and left non-steering wheels of the vehicle;
a detector configured to detect a forward and backward traveling direction of the vehicle; and
an output configured to output a relative position and a relative direction of the vehicle from an estimation start state,
the at least one processor configured to estimate a vehicle position of the vehicle on a basis of the yaw angle displacement amount, the travel distance, and the forward and backward traveling direction of the vehicle, wherein
the at least one processor configured to correct the yaw angle displacement amount of the vehicle in a direction of reducing an error in the yaw angle displacement amount at an estimation start point with respect to a reference direction in which the vehicle is to travel depending on output of the pulse waveform from the wheel speed sensor provided in the right and left non-steering wheels of the vehicle immediately after a startup, wherein
a yaw angle change based on a first one pulse of the vehicle at the startup is stored for each startup, and abnormality of the wheel speed sensor is determined in a case where an occurrence probability in a direction of the yaw angle change is different on right and left sides.

2. The vehicle control device according to claim 1, wherein
the yaw angle displacement amount of the vehicle is reduced by an amount corresponding to the yaw angle change based on the first one pulse of the vehicle at the startup to correct the yaw angle displacement amount.

3. The vehicle control device according to claim 1, wherein
in a case where abnormality of the wheel speed sensor is determined, a wheel speed pulse count counted from a pulse waveform generated by, as an alternative of the wheel speed sensor provided in the right and left non-steering wheels, a wheel speed sensor provided in right and left steering wheels of the vehicle is used.

4. The vehicle control device according to claim 1, wherein
the yaw angle displacement amount of the vehicle is reduced by an amount corresponding to a yaw angle with respect to the reference direction at a time of first right or left simultaneous pulse detection after the startup of the vehicle to correct the yaw angle displacement amount.

5. The vehicle control device according to claim 1, wherein
a range in which the yaw angle displacement amount of the vehicle is corrected is limited to a range in which the travel distance of the vehicle from the estimation start point is within a predetermined distance.

6. The vehicle control device according to claim 5, wherein
the predetermined distance is set to a distance at which a probability that a correction direction of the yaw angle displacement amount of the vehicle and a steering direction of the vehicle do not match falls within a predetermined probability.

7. The vehicle control device according to claim 6, wherein
in a case where the distance is equal to or less than a predetermined threshold value, correction of the yaw angle displacement amount of the vehicle is restricted.

8. A vehicle control device, comprising:
at least one processor configured to:
calculate a yaw angle displacement amount and a travel distance of a vehicle from a wheel speed pulse count counted from a pulse waveform generated by a wheel speed sensor provided in right and left non-steering wheels of the vehicle;
a detector configured to detect a forward and backward traveling direction of the vehicle; and
an output configured to output a relative position and a relative direction of the vehicle from an estimation start state,
the at least one processor configured to estimate a vehicle position of the vehicle on a basis of the yaw angle displacement amount, the travel distance, and the forward and backward traveling direction of the vehicle,
wherein the at least one processor configured to correct the yaw angle displacement amount of the vehicle in a direction of reducing an error in the yaw angle displacement amount at an estimation start point with respect to a reference direction in which the vehicle is to travel depending on output of the pulse waveform from the wheel speed sensor provided in the right and left non-steering wheels of the vehicle immediately after a startup,
wherein the yaw angle displacement amount of the vehicle is reduced by an amount corresponding to a yaw angle change based on a first one pulse of the vehicle at the startup to correct the yaw angle displacement amount, and
wherein the yaw angle displacement amount of the vehicle is reduced by one-half of the yaw angle change based on the first one pulse of the vehicle at the startup to correct the yaw angle displacement amount.

9. A vehicle control device, comprising:
at least one processor configured to:
calculate a yaw angle displacement amount and a travel distance of a vehicle from a wheel speed pulse count counted from a pulse waveform generated by a wheel speed sensor provided in right and left non-steering wheels of the vehicle;
a detector configured to detect a forward and backward traveling direction of the vehicle; and
an output configured to output a relative position and a relative direction of the vehicle from an estimation start state,
the at least one processor configured to estimate a vehicle position of the vehicle on a basis of the yaw angle displacement amount, the travel distance, and the forward and backward traveling direction of the vehicle, wherein the at least one processor configured to correct the yaw angle displacement amount of the vehicle in a direction of reducing an error in the yaw angle displacement amount at an estimation start point with respect to a reference direction in which the vehicle is to travel depending on output of the pulse waveform from the wheel speed sensor provided in the right and left non-steering wheels of the vehicle immediately after a startup, wherein the yaw angle displacement amount of the vehicle is reduced by an amount corresponding to a yaw angle with respect to the reference direction at a time of first right and or left simultaneous pulse detection after the startup of the vehicle to correct the yaw angle displacement amount, and wherein the yaw angle displacement amount of the vehicle is reduced by one-half of the yaw angle with respect to the reference direction at the time of first right and left simultaneous pulse detection after the startup of the vehicle to correct the yaw angle displacement amount.

* * * * *